United States Patent [19]

Peterson et al.

[11] Patent Number: 5,195,184
[45] Date of Patent: Mar. 16, 1993

[54] METHOD AND SYSTEM FOR HIGH SPEED DATA TRANSFER

[75] Inventors: Paul A. Peterson, Dayton; Samir J. Nanavaty, Kettering, both of Ohio

[73] Assignee: NCR Corporation, Dayton, Ohio

[21] Appl. No.: 450,972

[22] Filed: Dec. 15, 1989

[51] Int. Cl.⁵ ............................................. G06F 13/38
[52] U.S. Cl. .................... 395/325; 364/DIG. 2; 364/927.99; 364/926.3; 364/939.4; 364/937; 364/942.7
[58] Field of Search ............... 364/DIG. 1, DIG. 2; 395/275, 200, 325; 370/94.1; 375/8

[56] References Cited

U.S. PATENT DOCUMENTS

| | | | |
|---|---|---|---|
| 3,676,846 | 7/1972 | Busch | 364/DIG. 1 |
| 4,549,302 | 10/1985 | Heatherington | 375/8 |
| 4,607,348 | 8/1986 | Sheth | 364/DIG. 2 |
| 4,680,773 | 7/1987 | Amundson | 375/8 |
| 4,688,214 | 8/1987 | DeWitt et al. | 370/94 |
| 4,691,314 | 9/1987 | Bergins et al. | 370/94 |
| 4,755,992 | 7/1988 | Albal | 370/94 |
| 4,790,003 | 12/1988 | Kepley et al. | 379/88 |
| 4,845,710 | 7/1989 | Nakamura et al. | 370/110.1 |
| 4,965,801 | 10/1990 | DuLac | 364/DIG. 2 |

FOREIGN PATENT DOCUMENTS 0072614 2/1983 European Pat. Off. .
0178287 4/1986 European Pat. Off. .

*Primary Examiner*—Thomas M. Heckler
*Attorney, Agent, or Firm*—Douglas S. Foote

[57] ABSTRACT

A method of transferring data from a computer to a remote entity. A predetermined block count is stored in the computer. One or more data blocks are moved from the computer to one or more buffers, respectively, in an interfacing device. The block count is decremented for each of the data blocks so moved. One or more of the data blocks are then transmitted from the interfacing device to the remote entity. An acknowledge signal is received from the remote entity for each data block received by the remote entity, and the block count is incremented for each acknowledge signal so received.

22 Claims, 3 Drawing Sheets

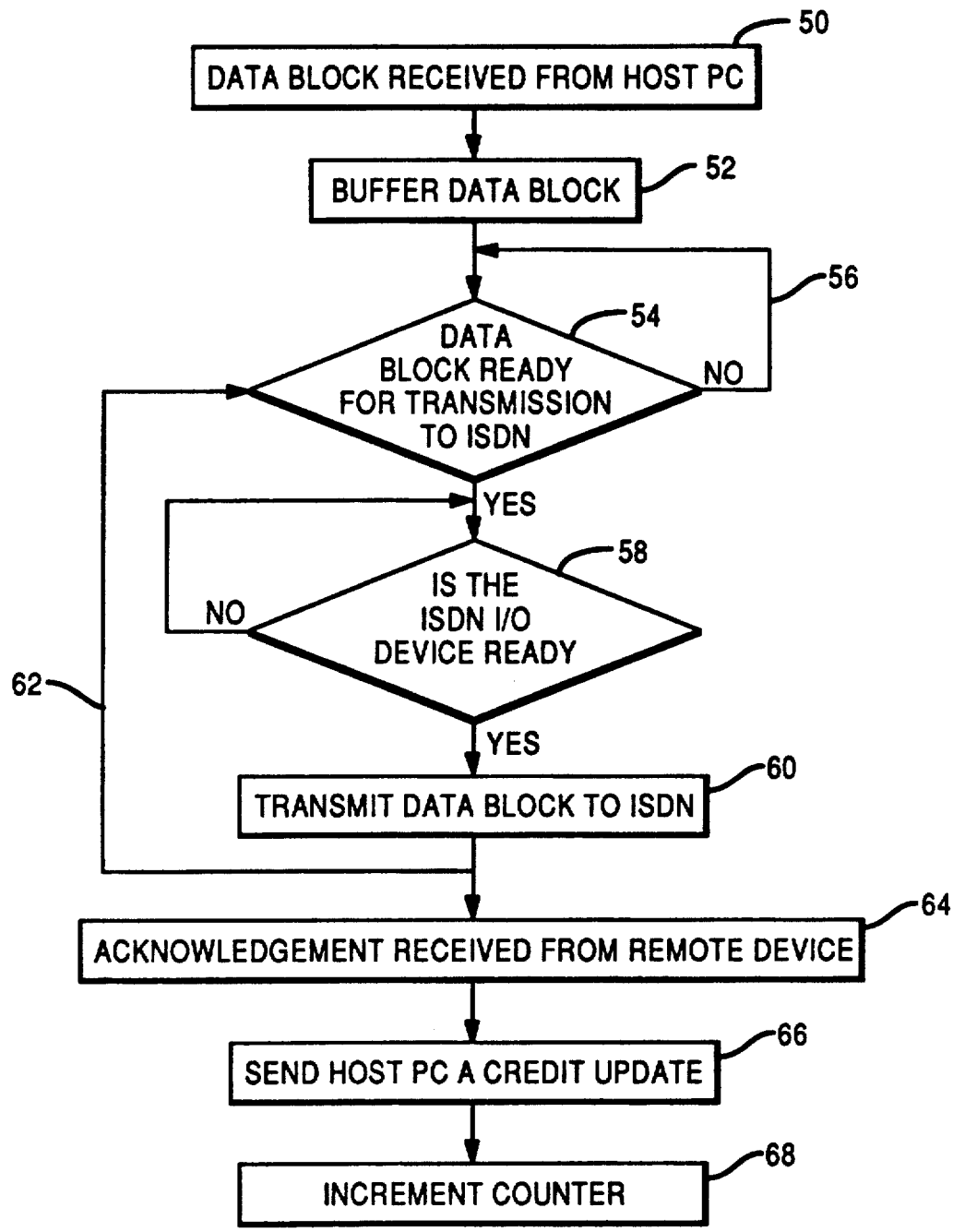

METHOD AND SYSTEM FOR HIGH SPEED DATA TRANSFER

The present invention relates to a method and system for enhancing data throughput in a wide area network. More particularly, it relates to a method and system for transferring blocks of data from a processor to a remotely located device over an ISDN serial transmission line.

BACKGROUND OF THE INVENTION

This application is related to U.S. patent application Ser. No. 451,396 filed concurrently herewith.

In the past, the transfer of data between remotely located terminal equipment such as PCs has been relatively slow and characterized by transmission errors. Telephone lines used for data transfers have one or more links which only carry analog signals. Typically, the local telephone line or link between a PC and the first switching station handles only analog signals. In order to serially transmit data from a PC over an analog phone line, a device such as a modem converts digital data to an analog signal. Although many long distant calls are converted and transmitted digitally, there still remains a number of analog links for most transmissions. The problem with analog transmission is that amplifiers used to boost the analog signals can distort the original signal causing error rates in the data roughly equivalent to the distance of the transmission. As a result of the relatively large number of errors possible from such transmissions, relatively small packets of data are transmitted at one time with frequent retransmission of the data as errors are detected. The result of such transmission errors is to slow down the data transfer rate with typical rates at about 1200 to 2400 bits per second.

In recent years, technology for digital data transmission has advanced. Digital transmission has a much lower error rate since amplifiers can easily and exactly restore a digital signal which only has two possible values. Digital transmission also permits multiplexing of various digitally encoded signals such as data, audio and video. Digital transmission is increasingly playing an important role in enhancing wide area computer networks which utilize telephone lines. One such digital network is referred to as Integrated Services Digital Network (ISDN). ISDN offers a wide range of services, most notably an increased transmission speed on the order of 64,000 bits per second.

In order to take full advantage of the potential of ISDN, data throughput as it relates to the speed at which data is transferred onto an ISDN line must be addressed. A typical PC has a terminal adaptor card for interfacing with a communications line. This card receives blocks of data from the PC, transmits the data over the communications line, and then sends an acknowledge signal to the PC. The time required to transfer a data block from the PC to the terminal adaptor card and to wait for an acknowledgment can be many times greater than the time required to transmit the data block over the ISDN line. Thus, the full potential offered by ISDN technology is not realized.

OBJECTS OF THE INVENTION

It is therefore an object of the present invention to provide a new and improved method for serially transferring data from a computer to a remote entity.

It is another object of the present invention to provide a new and improved data communications system.

It is a further object of the present invention to provide a method for improving data throughput in a data communications system.

It is yet another object of the present invention to provide a method for serially transferring blocks of data over an ISDN transmission line.

It is yet a further object of the present invention to provide a system and method for high speed serial data transfer between a computer and a remote entity.

SUMMARY OF THE INVENTION

The present invention is a method of transferring data from a computer to a remote entity. A predetermined block count is stored in the computer. One or more data blocks are moved from the computer to one or more buffers, respectively, in an interfacing device. The block count is decremented for each of the data blocks so moved. One or more of the data blocks are then serially transmitted from the interfacing device to the remote entity. An acknowledge signal is received from the remote entity for each data block received by the remote entity, and the block count is incremented for each acknowledge signal so received.

Another form of the present invention is a data communications system comprising a computer, an interfacing device, transmitting means and a counter. The computer generates a plurality of data blocks and stores a block count in the counter. The interfacing device is connected to the computer and includes a plurality of buffers for receiving the data blocks from the computer. The transmitting means serially transmits data blocks from the buffers to a remote entity and receives an acknowledge signal in response to successfully transmitted data blocks. The counter decrements the block count in response to a data block transferred to the interfacing device and increments the count in response to the acknowledge signal.

BRIEF DESCRIPTION OF THE DRAWINGS

FIGS. 2 and 3 show flow diagrams describing the operation of the present invention.

DESCRIPTION OF A PREFERRED EMBODIMENT

Figure 1:
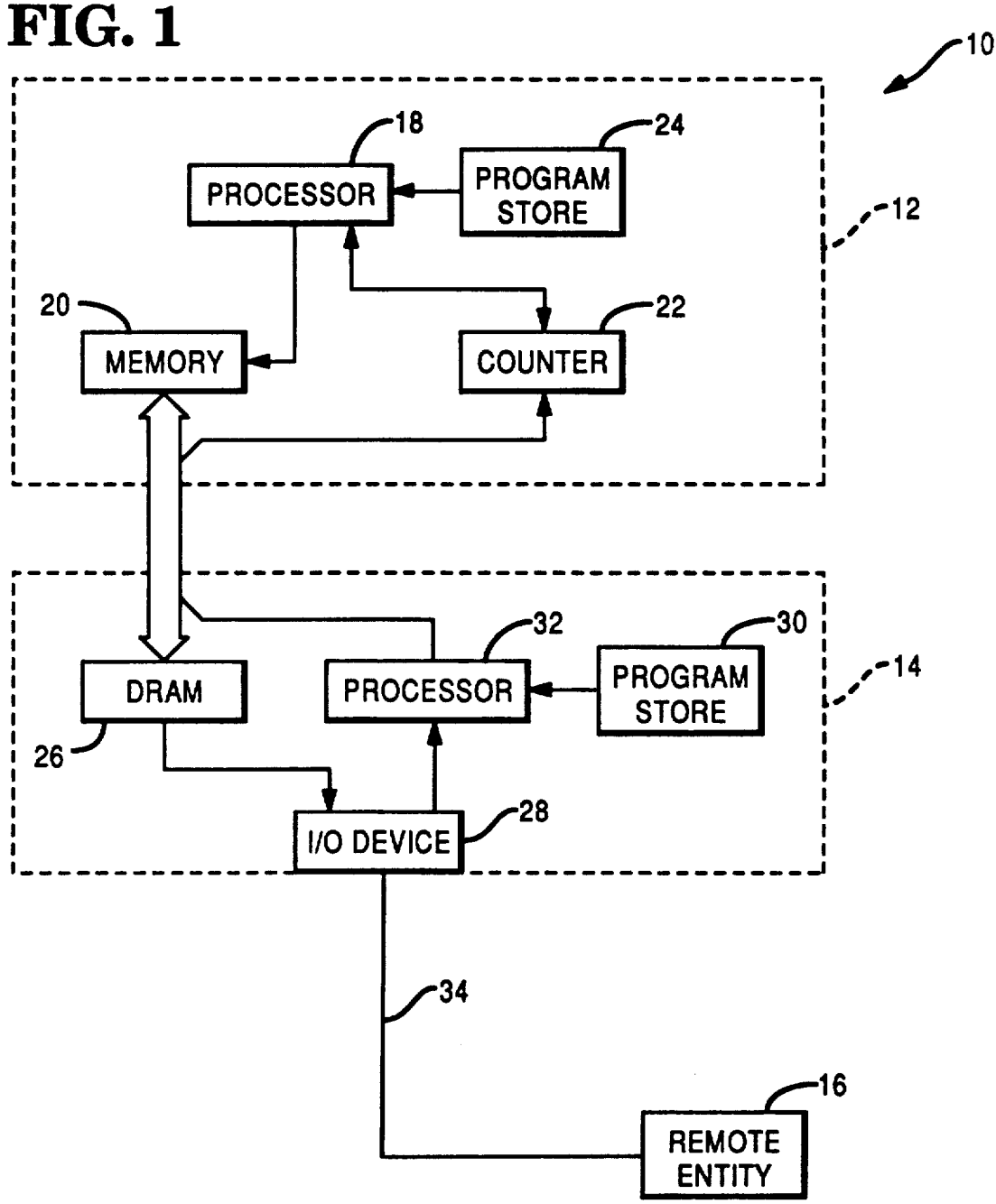
FIG. 1 is a block diagram of a data communications system according to the present invention.

FIG. 1 shows a data communications system 10 having a computer 12, interfacing device 14 and a remote entity 16. In a preferred embodiment, computer 12 is a personal computer (PC). The components in computer 12 relevant to the present invention are a processor 18, memory 20, counter 22, and a program store 24. Data generated by computer 12 to be transferred therefrom is stored in memory 20 in a plurality of logically defined data frames or data blocks. Data blocks are transferred from computer 12 under the control of processor 18 running a program in store 24 and subject to the value in counter 22, as will be described more fully hereinafter.

Interfacing device 14 includes a dynamic RAM (DRAM) 26, an I/O device 28, a program store 30 and a processor 32. In a preferred embodiment, interfacing device 14 is a modular board or card which may be plugged into an expansion slot on computer 12. DRAM 26 includes a plurality of logically defined memory units or buffers for receiving data blocks transferred from computer 12, as will be described more fully hereinafter. Typically, data is transferred in parallel from computer 12 to interfacing device 14. I/0 device 28 serially transmits data blocks from DRAM 26, over an ISDN transmission line 34, to remote entity 16. I/0 device 28 also receives acknowledge signals from remote entity 16 over ISDN line 34 for each data block successfully transmitted. In one embodiment, remote entity 16 may itself consist of a computer and interfacing device such as computer 12 and interfacing device 14 described above. In such embodiment, I/0 device 28 may also receive data blocks from remote entity 16 as well as transmit acknowledge signals thereto.

Counter 22 stores a block count of the number of data blocks which at any given time may be transferred from memory 20 to DRAM 26. The count is decremented in response to each data block so transferred, and the count is incremented in response to each acknowledge signal received by counter 22.

Figure 2:
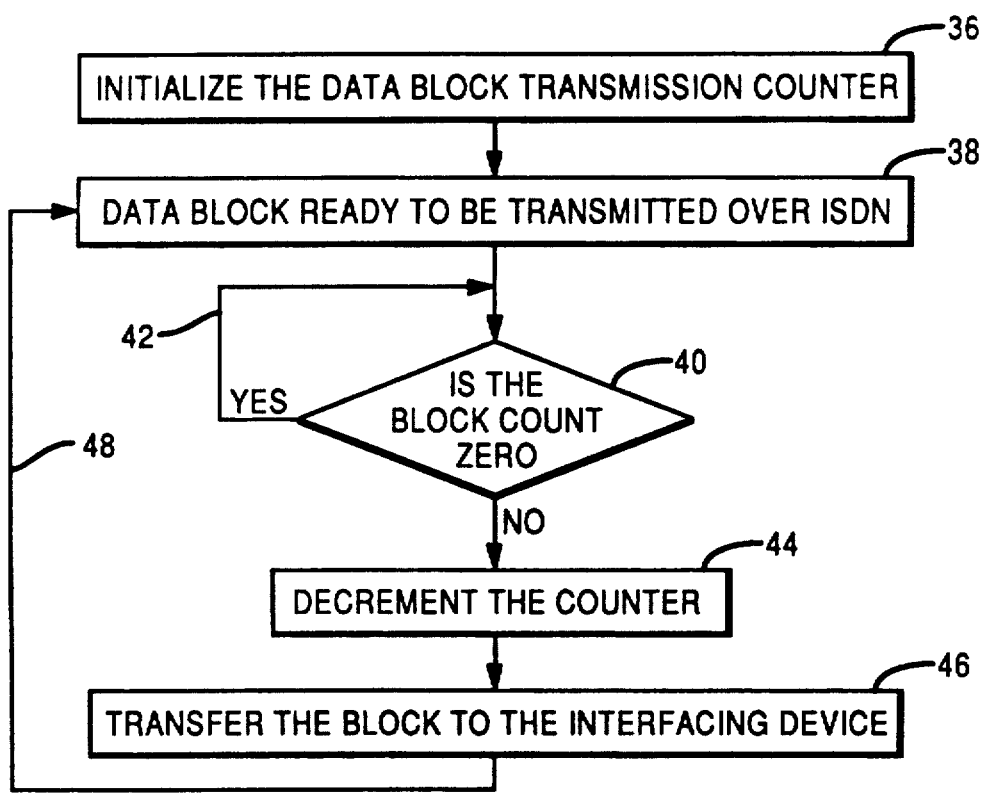

The operation of the present invention may be understood by referring to the flow diagram shown in FIGS. 2 and 3. Referring to FIG. 2, the first step in the process of transferring data from computer 12 to remote entity 16 is to initialize the data block transmission counter 22 (block 36) by storing a predetermined block count or number of credits in counter 22. Whenever a data block is ready to be transferred to interfacing device 14 for transmission over ISDN line 34 (block 38), the block count in counter 22 is checked (block 40). If the count is zero, the transfer enters a wait state indicated by line 42. If the count is greater than zero, the transfer can proceed. The block count in counter 22 is decremented (block 44), and the data block is moved to a buffer in interfacing device 14's DRAM 26 (block 46). The sequence of decrementing the count and moving a data block is not critical and the block count may be decremented after the data block is moved or contemporaneously therewith. As long as the block count is greater than zero, additional data blocks may be moved to respective buffers in DRAM 26 (line 48) irrespective of whether any data block has been transferred from interfacing device 14 over ISDN line 34.

FIG. 3 shows a flow diagram of data transfer from interfacing device 14 to remote entity 16. This process may commence as soon as a data block has been transferred to interfacing device 16 from computer 12 (block 46) (FIG. 2). Data blocks are received by interfacing device (block 50) and are stored in respective data buffers in DRAM 26 (block 52). Data blocks stored in DRAM 26 are ready for transmission over ISDN line 34 (block 54). If a data block is not ready for transmission, the transfer enters a wait state (line 56). If a data block is ready for transmission, I/0 device 28 is checked to see if it is ready to transmit data. If not ready, the transfer enters a wait state (line 58). If I/0 device 28 is ready, a data block is serially transmitted from interfacing device 14 to remote entity 16 (block 60) over ISDN line 34. As long as there is a data block in DRAM 26 ready for transmission, the transmission process may continue (line 62 and blocks 56, 58 and 60) for additional data blocks.

After one or more data blocks has been transmitted from interfacing device 14 to remote entity 16, an acknowledge signal will be received for each of such data blocks received by the remote entity (block 64). The acknowledge signal is transmitted from the interfacing device to computer 12 (block 66) in the form of a credit update, and the block count in counter 32 is incremented (block 68). Subsequent acknowledge signals will be received for each data block received by remote entity 16, and the block count will be incremented accordingly.

The transmission of data blocks from interfacing device 14 generally proceeds independently of the movement of data blocks from computer 12 to device 14. In fact, each such transfer may be performed contemporaneously with the other. As long as the block count in counter 22 is greater than zero, data blocks may be moved to DRAM 26. As long as there are data blocks in DRAM 26 and the I/0 device is ready, data blocks may be serially transmitted over ISDN line 34 to remote entity 16. When the block count reaches zero, further data blocks may not be transferred to interfacing device 14. However, data blocks may continue to be transmitted from interfacing device 14 to remote entity 16. The movement of data blocks from computer 12 to DRAM 26 may resume when the block count is incremented upon receipt of an acknowledge signal.

As noted previously, the buffers for storing data blocks in interfacing device 14 are logically defined address spaces in DRAM 26. At the time the system is initialized, a predetermined number of such buffers are allocated to receive the data blocks sequentially moved from computer 12. Preferably, the allocation of buffers is performed in association with the counter initialization (block 36), and the number of buffers so allocated is the same as the maximum number of credits stored in counter 22.

Data stored in memory 20 may be contained in a plurality of data frames which have a different size than that of the data blocks buffered and transmitted from interfacing device 14. For example, each such data frame may be larger than a data block. In this circumstance, each data frame will be segmented into a plurality of data blocks prior to being moved to DRAM 26. It may further be desirable to move all of the data blocks in a data frame to DRAM 26 prior to transmitting the data blocks to remote entity 16. Further, the block count would not be incremented until the transmission of all such data blocks is complete.

It will be clear to those skilled in the art that the present invention is not limited to the specific embodiment disclosed and illustrated herein. Numerous modifications, variations, and full and partial equivalents can be undertaken without departing from the invention as limited only by the spirit and scope of the appended claims.

What is desired to be secured by Letters Patent of the United States is as follows.

What is claimed is:

1. A method of transferring data from a computer to a remote entity comprising:
   a. storing a predetermined data block count in said computer;
   b. moving one or more data blocks from said computer to one or more buffers, respectively, in an interfacing device;
   c. decrementing said data block count for each of said data blocks so moved;
   d. serially transmitting one or more of said data blocks from said interfacing device to said remote entity;
   e. receiving an acknowledge signal from said remote entity for each data block received by said remote entity; and f. incrementing said data block count for each acknowledge signal so received.

2. The method of claim 1 wherein the data to be transferred is logically contained in a data frame which is larger than a data block, said method further comprising prior to step "b":
   segmenting said data frame into a plurality of data blocks.

3. The method of claim 2 wherein all of the data blocks in a data frame are moved into said buffers prior to step "d".

4. The method of claim 3 wherein step "f" is performed after all of the data blocks in the data frame have been transmitted in step "d".

5. The method of claim 1 further comprising in association with step "a":
   allocating a predetermined number of buffers in said interfacing device to receive data blocks sequentially moved from said computer to said interfacing device.

6. The method of claim 5 wherein said predetermined data block count and said predetermined number of buffers are the same.

7. The method of claim 1 wherein said buffers are logically defined address spaces in a memory.

8. The method of claim 7 wherein said memory is a dynamic RAM.

9. The method of claim 1 further comprising:
   g. repeating steps "b" through "f".

10. The method of claim 1 wherein a step "b" moving of a data block is performed contemporaneously with a step "d" transmitting of a data block previously moved to one of said buffers.

11. The method of claim 1 further comprising:
    g. repeating steps "b" through "f" until said data block count is zero; and
    h. performing steps "d" through "f".

12. The method of claim 1 wherein said data block count is stored in a counter, said interfacing device receives said acknowledge signal, and wherein said method further comprises after step "e":
    transmitting said acknowledge signal from said interfacing device to said counter.

13. A method of transferring data from a computer to a remote entity comprising:
    a. storing a predetermined data block count in said computer;
    b. moving one or more data blocks from said computer to one or more of a predetermined number of buffers, respectively, in an interfacing device, said number being related to said data block count;
    c. decrementing said data block count for each of said data blocks so moved;
    d. serially transmitting one or more of said data blocks from said interfacing device to said remote entity;
    e. receiving an acknowledge signal from said remote entity for each data block received by said remote entity;
    f. incrementing said data block count for each acknowledge signal so received;
    g. repeating steps "b" through "f" until said data block count is zero; and
    h. performing steps "d" through "f".

14. The method of claim 13 wherein a step "b" moving of a data block is performed contemporaneously with a step "d" transmission of a data block previously moved to one of said buffers, said predetermined data block count and said predetermined number of buffers are the same, and said buffers are logically defined address spaces in a dynamic RAM.

15. The method of claim 14 wherein said data block count is stored in a counter, said interfacing device receives said acknowledge signal, and wherein said method further comprises after step "e":
    transmitting said acknowledge signal from said interfacing device to said counter.

16. The method of claim 15 wherein the data to be transferred is logically contained in a data frame which is larger than a data block, said method further comprising prior to step "b":
    segmenting said data frame into a plurality of data blocks;
    wherein all of the data blocks in a data frame are moved into said buffers prior to step "d", and step "f" is performed after all of the data blocks in the data frame have been transmitted in step "d".

17. A data communications system comprising:
    a computer for generating a plurality of data blocks and for storing a data block count;
    an interfacing device connected to said computer and including a plurality of buffers for receiving said data blocks from said computer;
    means for serially transmitting said data blocks from said buffers to a remote entity and for receiving an acknowledge signal in response to successfully transmitted data blocks; and
    means for decrementing said data block count in response to a data block transferred to said interfacing device and for incrementing said count in response to said acknowledge signal.

18. The system of claim 17 wherein said buffers are logically defined address spaces in a memory.

19. The system of claim 18 wherein said memory is a dynamic RAM.

20. The system of claim 17 wherein said decrementing/incrementing means includes a counter in said computer.

21. The system of claim 17 wherein said transmitting means includes an ISDN line connected between said interfacing device and said remote entity.

22. A data communications system comprising:
    a computer for generating a plurality of data blocks and for storing a data block count;
    an interfacing device connected to said computer and including a plurality of buffers for receiving said data blocks from said computer;
    an ISDN line connected between said interfacing device and said remote entity for serially transmitting said data blocks from said buffers to a remote entity and for receiving an acknowledge signal in response to successfully transmitted data blocks; and
    a counter in said computer for decrementing said data block count in response to a data block transmitted to said interfacing device and for incrementing said count in response to said acknowledge signal;
    wherein said buffers are logically defined address spaces in a dynamic RAM.

* * * * *